July 4, 1933.  H. FRANKE  1,917,108
METHOD OF AND SYSTEM FOR TAKING X-RAY PHOTOGRAPHS
Filed Feb. 5, 1931    2 Sheets-Sheet 1
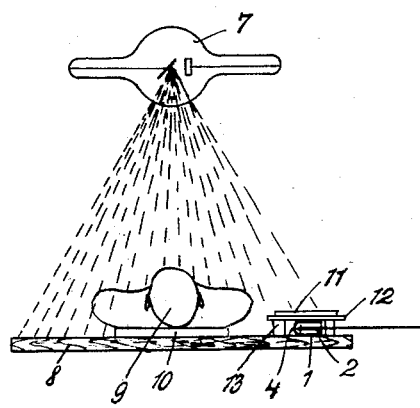
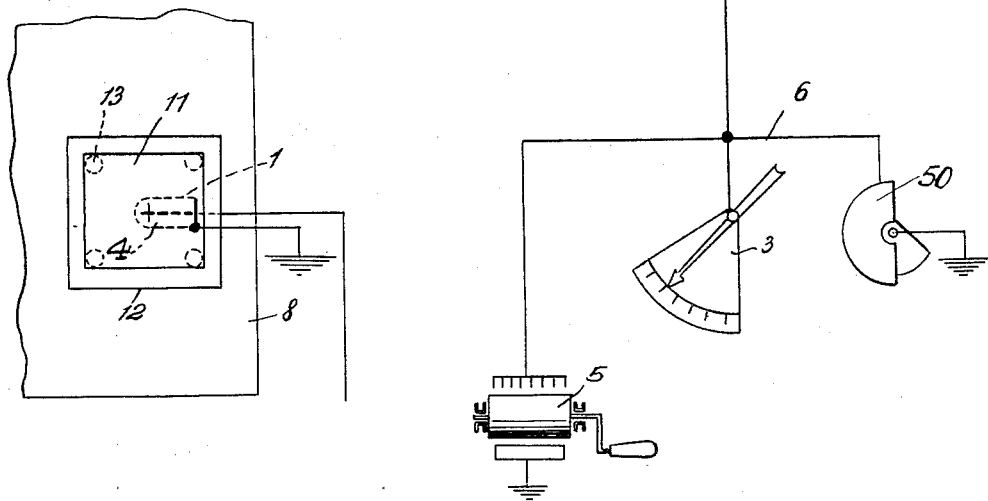

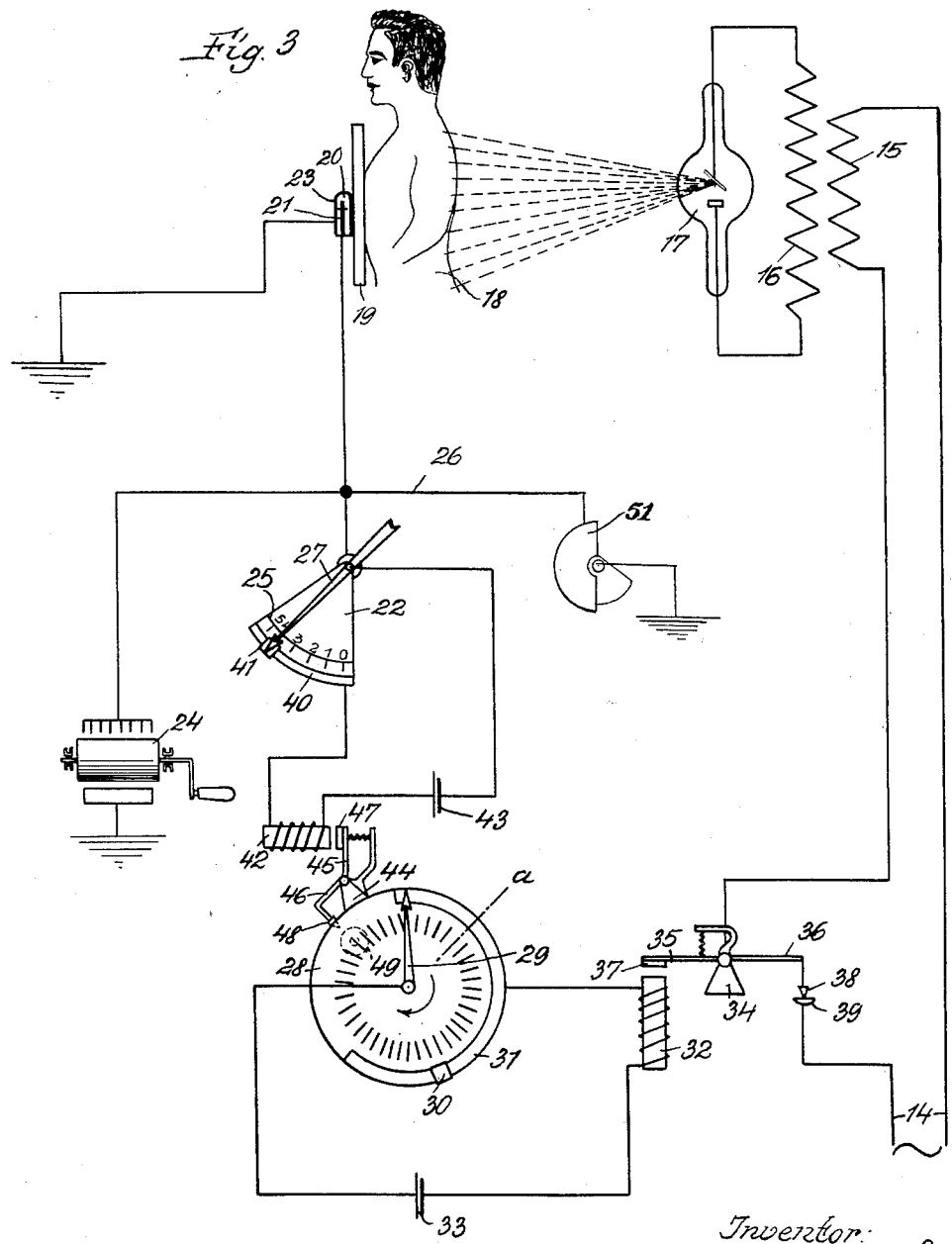

Patented July 4, 1933

1,917,108

UNITED STATES PATENT OFFICE

HEINRICH FRANKE, OF HAMBURG-ALTONA, GERMANY, ASSIGNOR TO C. H. F. MÜLLER AKTIENGESELLSCHAFT, OF HAMBURG-FUHLSBUTTEL, GERMANY, A CORPORATION OF GERMANY

METHOD OF AND SYSTEM FOR TAKING X-RAY PHOTOGRAPHS

Application filed February 5, 1931, Serial No. 513,677, and in Germany December 2, 1929.

My invention relates to improvements in the method of and system for taking X-ray photographs, and more particularly in the method and system described in my copending application for patent Ser. No. 434,025, filed March 7, 1930, in which a measuring instrument comprising a cell responsive to radiation is provided for regulating the time of the exposure for obtaining the most favourable blackening of the sensitized plate, the said cell being placed in the path of the X-rays for measuring the absorption of the object. As described in the said application the cell of the measuring instrument is located at the rear of the box containing the sensitized film or plate, and the exposure is interrupted when the instrument shows a value corresponding to the most favourable blackening of the plate. When making the exposure a box must be used the rear wall of which is provided with a hole permitting the passage of the X-rays intended to act on the cell. In some cases and particularly when taking a photograph of a reclining patient the patient is inconvenienced by disposing the cell at the rear of the box.

One of the objects of the improvements is to provide a method and a system in which an ordinary box may be provided, and in which the said box may be disposed so that it does not inconvenience the patient, and with this object in view my invention consists in disposing the said cell in a part of the rays emanating from the tube which are directed laterally of the object being photographed, and placing a filter between the tube and the said cell, which has the same absorption as the object. I have discovered that with sufficient accuracy, a filter of a thickness corresponding to the thickness of the object may be employed.

When using the method described in my aforesaid application for patent, the most favourable time of the exposure mainly depends on the degree of the absorption of the rays by the object. If the said object has a high absorbing power, the X-ray tube must be under load for a long period of time for obtaining the most favourable blackening of the sensitized plate.

Another object of the improvements is to provide means for preventing overloading of the tube, and with this object in view I provide a safety device comprising time controlled mechanism for automatically opening the circuit of the tube when or before the highest permissible time of operation of the tube has been attained. By means of this safety device injury to the tube by overload is prevented even if an object of high absorbing power is radiated. In carrying out this part of my invention I connect the safety device with the aforesaid measuring instrument comprising a cell sensitive to radiation, the said instrument operating a relay after the highest permissible time of exposure for arresting the time controlled mechanism.

For the purpose of explaining the invention several examples embodying the same have been shown in the accompanying drawings in which the same reference characters have been used in all the views to indicate corresponding parts. In said drawings, Fig. 1 is a diagram of elevation showing my improved system, Fig. 2 is a detail plan view on an enlarged scale showing the sensitive cell and the filter covering the same, and Fig. 3 is a diagram similar to the one illustrated in Fig. 1 and showing a modification and in addition a time controlled mechanism connected with the measuring instrument.

In the example shown in Figs. 1 and 2 the system comprises an ionimetric measuring instrument similar in construction to the one described in the above-mentioned application for patent. The said instrument comprises a cell or chamber 1 which is sensitive to radiation, and which as shown is in the form of a thimble. The insulated electrode 2 of the said cell 1 is connected with an electrometric indicating device 3, and the jacket 4 of the cell providing the other electrode is grounded.

The insulated electrode 2 of the said ionimetric system is connected with one terminal of an electro-static machine 5 the other terminal of which is grounded. Thereby a negative charge is imparted to the electrode 2 the potential of which can be read from the electrometer 3. Further, the electrode 2 is connected by a lead 6 with one terminal of a rotary condensor 50 the other terminal of which is grounded. If X-rays impinge on the charged ionization cell 1 the air within the said cell is ionized, and thereby a part of the electric charge is removed, the amount of which corresponds to the energy of the radiation, so that the voltage indicated by the electrometer 3 falls off in accordance with the said amount of electricity removed from the system and the capacity thereof. Thus for a given ionization and a constant capacity the loss of the voltage shown by electrometer is a function of the energy of the radiation impinging on the ionization chamber, and therefore of the blackening of the plate caused by the energy of the radiation. The sensitiveness of the system may be corrected by varying the capacity of the system by means of the rotary condenser 50.

The radiation emanating from the X-ray tube 7 passes through the object to be exposed, for example a patient 9 lying on a table 8. Between the said table 8 and the patient 9 there is a box 10 containing a sensitized film or plate.

So far the apparatus is similar to the system described in my aforesaid application. As distinguished from the system described in the said application, the cell 1 which is sensitive to radiation is located on the table 8 at the side of the patient 9 and in a pencil of rays emanating from the tube 7 and directed laterally of the patient.

Between the X-ray tube 7 and the cell 1 and immediately above the same there is a ray filter which as shown is in the form of an aluminium plate 11 supported on a plate 12 made from a material permeable to rays such for example as glass and supported on the table 8 by means of legs 13.

In the operation of the system I first gauge a sensitized plate of the character to be used in the exposure by means of the measuring instrument 1, 3 as has been described in my aforesaid application for patent. The cell 1 is placed at the rear of the sensitized plate, and I determine by experiment the displacement of the hand of the electrometer 3 resulting from the exposure necessary for obtaining the most favourable blackening of the sensitized plate. This displacement may correspond to the position of the hand of the instrument on the fourth scale mark as is shown in Fig. 1.

Before making the exposure the absorption coefficient of the patient 9 is determined by means of a suitable instrument. For this purpose the thickness of the part of the body of the patient to be radiated is ascertained by means of suitable calipers. It may be found for example that a cranium exposed from the side corresponds to a filter consisting of an aluminium plate of a thickness of two millimeters, or a cranium exposed from the front side to an aluminium filter of a thickness of three millimeters. Therefore an aluminium plate 11 corresponds to the absorption coefficient of the body and the said plate represents the absorption of the said body. The said plate is placed on the plate 12 located at the side of the patient 9. If necessary several aluminium plates having a total absorption coefficient corresponding to the coefficient of the object previously ascertained may be superimposed. The cell 1 is placed on the table 8 below the filter 12.

When making the exposure a median part of the beam of rays emanating from the X-ray tube 7 is directed through the patient 9 and on the sensitized plate confined within the box 10, while the cell 1 is radiated by a lateral portion of the beam of rays, which portion first passes through the aluminium plate 11. The cell 1 is subjected to the same or substantially the same energy of radiation as in the system in which it is placed into the field of the median portions of the pencil of rays passing through the patient 9 and the box 10 and at the rear of the patient and the box, because the aluminium plate 11 is equivalent to the patient 9 with reference to the absorption coefficient.

After energizing the tube 7 the electrometer 3 is observed, and when the hand thereof has come to the point which before has been fixed by calibrating the sensitized plate, for example when its hand arrives on the fourth scale mark the exposure is interrupted. Therefore the electrometer 3 indicates the time for interrupting the exposure which corresponds to the most favourable blackening of the sensitized plate.

In the modification shown in Fig. 3 leads 14 connected with an alternating current supply circuit 14 are connected with the primary 15 of a voltage transformer, the secondary 16 of which is connected with a glowing cathode X-ray tube 17. The rays emanating from the tube 17 pass through the object 18 and impinge upon the sensitized plate or film contained in the box 19. In the path of the rays of the tube 17 and at the rear of the object 18 and the box 19 there is an ionimetric cell 20, the insulated electrode 21 of which is connected with an electrometric measuring instrument 22, while the jacket 23 of the cell providing the other electrode is grounded. The electrode 21 of the said ionimetric system is connected with one terminal of an electrostatic machine 24 the other terminal of which is grounded, the said electro-static machine imparting a negative charge to the insulated electrode 21 the voltage of which is read from the scale 25 of the electrometer 22. Further the electrode 21 is connected by a lead 26 with one terminal of a rotary condenser 51, the other terminal of which is grounded.

If now the charged ionization cell 20 is exposed to the X-rays the air within the said cell is ionized, and a part of the electric charge thereof is removed which corresponds to the energy of the radiation, so that the indication of the electrometer 22 falls off in accordance with the amount of electric charge removed and the capacity of the system.

When using the ionimetric measuring instrument by means of the said instrument at first a sensitized plate of the character of the plate to be used in the exposure is calibrated in the manner described in my aforesaid application for patent. For making the exposure for example the cell 20 and the box 19 containing a sensitized plate are placed at the rear of the object 18. After switching in the apparatus the displacement of the hand of the electrometer is observed, and the exposure is interrupted when the hand 27 of the said electrometer has moved through the space previously determined by calibration and has reached for example the fourth scale mark. Therefore the electrometer 22 indicates the time when the exposure should be interrupted.

The apparatus so far described has been illustrated in my aforesaid application for patent, and it is provided with a safety device which will now be described. In the example shown in the figures the said safety device comprises a time controlled mechanism 28 of any known or preferred form and driven for example from a spring motor or the like. The hand 29 of the said time controlled apparatus is adapted to be reset and it cooperates with a contact 30 adapted to be set in any desired position relatively to and in contact with a segmental rail 31 of conductive material disposed concentrically in or upon the housing of the time controlled apparatus. The rail 31 is connected by a lead with one terminal of the coil of an electromagnet 32. The hand 29 is connected by a lead and through a battery 33 with the other terminal of the coil of the said electromagnet 32.

On a stationary bearing 34 a lever having two arms 35 and 36 is swivelled, the arm 35 of which carries an armature 37. The other arm 36 is insulated, and it carries a contact 38 cooperating with a contact 39. The arm 36 and the contacts 38, 39 are included in the circuit 14.

If the hand 29 of the time controlled apparatus is turned so far that it engages the contact 30 the circuit including the electromagnet 32 is closed. Therefore the armature 37 is attracted and the circuit of the primary 15 is interrupted at 38, 39, so that the X-ray tube 17 is de-energized.

The electrometer 22 is provided with a segmental marginal rail 40 of conductive material and on the said rail a contact 41 is shiftable, which cooperates with the hand 27 of the electrometer. The rail 40 is connected by a lead with one terminal of the coil of an electromagnet 42 and the hand 27 is connected by a lead with a battery 43 and the other terminal of the coil of the electromagnet 42. On a bearing 44 mounted on the casing of the time controlled apparatus 28 a bell crank lever 45, 46 is swivelled. The arm 45 of the said bell crank lever carries an armature 47 cooperating with the electromagnet 42, and the arm 46 carries a latch 48 adapted for locking engagement with a wheel 49 forming a part of the train of gear wheels of the time controlled apparatus 28.

When the hand 27 moving along the scale of the electrometer 22 engages the contact 41 the circuit including the electromagnet 42 is closed, the armature 47 is attracted and the time controlled apparatus 28 is arrested by the latch 48 engaging the wheel 49. In lieu of the aforesaid electromagnets 32 and 42 solenoids or the like may be used.

The operation of the apparatus is as follows:

It may be assumed that the most favourable blackening of the sensitized plate is obtained when the hand 27 arrives at the scale mark of the fourth scale 25 of the electrometer. At the beginning of the radiation both hands 27 and 29 are in their zero positions. The contact 41 is set on the fourth scale mark and the contact 30 is brought into the position corresponding to the highest permissible load of the tube. The tube 17 is now switched into the circuit by means of a switch lever (not shown in the figure), and the time controlled apparatus 28 is started by releasing the same from the locking device (not shown).

If an object 18 of exceptionally high absorption power is radiated it may happen that the highest permissible load of the tube is attained before the time of exposure corresponding to the most favourable blackening of the sensitized plate has passed. In my improved system the hand 29 engages the contact 30 when the said highest permissible load has been attained, so that in the manner described above, the tube 17 is switched out of the circuit by means of the electromagnet 32. It may be assumed that in this case the hand 27 has reached only the scale mark 3, when it is arrested by switching out the tube.

Now the time controlled apparatus 28 is arrested by means of the locking device, and the attendant allows the X-ray tube 17 to cool a short period of time, whereupon the hand 29 is turned in a direction opposite to the arrow shown in the figure and set to zero and the time controlled apparatus is again started. Now radiation is continued.

Now it may be assumed that the hand 27 of the electrometer continuing its movement reaches the scale mark 4 corresponding to the time of the most favourable blackening of the sensitized plate, before the hand 29 of the time controlled apparatus 28 arrives again on the contact 30.

When the hand 27 has reached the scale mark 4 the exposure is interrupted by the main switch of the X-ray tube. When moving the hand 27 into the position corresponding to the scale mark 4 the said hand engages the contact 41, so that the electromagnet 42 is energized in the manner described above and the time controlled apparatus 28 is arrested. Now the hand 29 is for example in the position as indicated in the figure in dotted lines. Therefore the attendant is enabled exactly to test the time with reference to the radiation performed by the tube. In the example described herein it is only necessary to add the period of time of the first movement of the hand 29 from zero to contact 30, and the period of time of the second movement of the hand 29 from zero to the point a, the sum representing the total of the time of the exposure from the beginning thereof to the moment when the most favourable blackening of the plate has been attained.

At the beginning of a new operation of the system the electrometer 22 is again loaded in the manner described. During the movement of the hand 27 to zero connected therewith the electromagnet 42 is deenergized, and the locking latch 48 is retracted from the train of gear wheels of the time controlled apparatus. The hand 29 of the said time controlled apparatus is likewise reset.

If an object 18 of very low absorption power is radiated, the time controlled apparatus 28 may be arrested by means of the said latch 48 without first moving the hand 29 through the contact 30 and thereafter resetting the same.

If desired, the electrometer 22 may be used for acting on a switching apparatus of known construction, by means of which the X-ray tube 17 is automatically switched out after the time of exposure corresponding to the most favourable blackening of the sensitized plate has passed.

Further locking means may be provided by means of which re-energization of the tube 17 is prevented after the contact 30 has been closed by the hand 29 of the time controlled apparatus, and before the hand 29 has been reset.

Finally mechanical or electrical winding mechanism may be provided for rewinding the time controlled apparatus 28 when the electrometer 22 is being loaded. The rewinding of the apparatus 28 and the loading of the electrometer 22 can be effected by means of a single lever.

I claim:

1. A system for taking X-ray photographs, comprising a source of X rays, a support for a sensitized body in the path of the X rays emanating from said source and in position for having an object placed between the same and the source of X rays, an apparatus for gauging the intensity of radiation and comprising a cell responsive to radiation and means connected with said cell for measuring the intensity of the radiation, means for deenergizing said source of X rays, time-controlled mechanism for automatically operating said deenergizing means and means controlled by said measuring apparatus for arresting said time-controlled mechanism.

2. A system for taking X-ray photographs, comprising a source of X rays, a support for a sensitized body in the path of the X rays emanating from said source and in position for having an object placed between the same and the source of X rays, an apparatus for gauging the intensity of radiation and comprising a cell responsive to radiation and means connected with said cell and comprising relatively adjustable contacts for measuring the intensity of the radiation, means for deenergizing said source of X rays, time controlled mechanism for automatically operating said deenergizing means, and means controlled by said contacts for arresting said time-controlled mechanism.

In testimony whereof I hereunto affix my signature.

HEINRICH FRANKE.

CERTIFICATE OF CORRECTION.

Patent No. 1,917,108.　　　　　　　　　　　　　　　　　　July 4, 1933.

HEINRICH FRANKE.

It is hereby certified that error appears in the printed specification of the above numbered patent requiring correction as follows: Page 1, line 73, strike out the words "elevation showing"; page 3, line 92, strike out the word "fourth" and insert the same before "scale" in line 91; and that the said Letters Patent should be read with these corrections therein that the same may conform to the record of the case in the Patent Office.

Signed and sealed this 22nd day of August, A. D. 1933.

M. J. Moore.

(Seal)　　　　　　　　　　　　　　　　　　　Acting Commissioner of Patents.